United States Patent [19]
Morfesis et al.

[11] Patent Number: 5,908,497
[45] Date of Patent: Jun. 1, 1999

[54] WATER SOLUBLE TITANIUM COMPLEXES AND USE AS FIBER GLASS SIZING

[75] Inventors: Anastasia Morfesis; Robert G. Swisher, both of O'Hara Township, Pa.

[73] Assignee: PPG Industries Ohio, Inc., Cleveland, Ohio

[21] Appl. No.: 08/994,120

[22] Filed: Dec. 19, 1997

[51] Int. Cl.$^6$ ...................................................... C09K 3/00
[52] U.S. Cl. ................ 106/287.18; 106/287.19; 556/54; 556/89; 556/57; 556/130
[58] Field of Search ......................... 106/287.18, 287.19; 556/54, 57, 88, 130

[56] References Cited

U.S. PATENT DOCUMENTS

| | | | |
|---|---|---|---|
| 4,216,107 | 8/1980 | Vogt et al. | 252/182 |
| 4,232,062 | 11/1980 | Okino et al. | 427/160 |
| 4,369,264 | 1/1983 | Baumann et al. | 523/209 |
| 4,892,712 | 1/1990 | Robertson et al. | 422/186 |
| 4,966,759 | 10/1990 | Robertson et al. | 422/186 |
| 5,032,241 | 7/1991 | Robertson et al. | 204/157.15 |
| 5,035,784 | 7/1991 | Anderson et al. | 204/158.14 |
| 5,045,288 | 9/1991 | Raupp et al. | 422/186.3 |
| 5,710,086 | 1/1998 | Brunelle et al. | 502/171 |

OTHER PUBLICATIONS

Dupont Performance Products, TYZOR® Titanates No date avail.

*Primary Examiner*—David Brunsman
*Attorney, Agent, or Firm*—Dennis G. Millman

[57] ABSTRACT

Organo-metal oxide chelates stable in aqueous compositions are provided by the reaction of metal alkoxide—where the metal is titanium, zinc, tungsten, or tin—and a polyalkylene glycol. Specific compounds are the reaction product of tetra alkyl titanates with diethylene glycol. Aqueous coating compositions containing the chelates may be applied to fiber glass at the filament stage or after forming into mats. When heat treated, the coated fiber glass serves as photocatalytic media.

6 Claims, No Drawings

WATER SOLUBLE TITANIUM COMPLEXES AND USE AS FIBER GLASS SIZING

BACKGROUND OF THE INVENTION

This invention involves the known photocatalytic effect of certain metal oxides such as titanium dioxide. More particularly, it involves compositions for coating the photocatalytic metal oxides onto carrier surfaces, thereby permitting practical means for bringing liquids or gases to be treated into contact with the catalytic material.

The use of metal oxides such as titanium dioxide to photocatalytically decompose organic material has been extensively treated in the prior art. In addition to titanium dioxide, the photocatalytic effect has been reported to have been achieved with the oxides of zinc, tungsten, and tin.

The utility of the photocatalytic compounds depends largely upon providing a solid carrier with large surface area so as to increase the contact area with the liquid or gas being treated. In U.S. Pat. No. 5,045,288 a layer of catalyst particles is loosely supported on a filter or in a granular bed. A more practical approach is to coat a solid support member with the catalyst. For example, use of porous ceramic substrates to support titanium dioxide coatings is disclosed in U.S. Pat. No. 5,035,784. Because the photocatalytic effect requires exposure of the catalyst to ultraviolet radiation, the use of a transparent substrate such as glass has been suggested. In particular, it has been recognized in U.S. Pat. Nos. 4,892,712; 4,966,759; and 5,032,241 (all to Robinson et al.) that fiberglass combines both transparency and high surface area, whereby carriers made from matrices of fiberglass are ideally suited for this purpose. Moreover, the art of fabricating high surface area materials from fiber glass (e.g., mats, filters, and fabrics—both woven and non-woven) is highly advanced and versatile. It would be highly advantageous for the sake of efficiency and cost to be able to apply a photocatalytic coating to fiber glass filaments and/or strands as they are being formed, prior to being processed into more complex product configurations. In other words, it would be desirable to apply these coatings in the same manner as sizing compositions are conventionally applied to fiber glass during its primary manufacturing stage. However, to be compatible with fiber glass sizing operations, the coating compositions need to be water based. This presents a problem because the organo-metallic compounds recommended by the prior art for photocatalytic coatings tend to be unstable in aqueous solutions due to premature gelation in the presence of water due to hydration which leads to polymerization. Providing metal oxide photocatalytic compounds that are stable in an aqueous environment would be useful in overcoming this problem.

Organic titanates available from DuPont under the name TYZOR are tetra alkoxy titanium compounds would be suitable for forming photocatalytic coatings but for their tendency to rapidly undergo hydrolysis in the presence of water. Because the suggested methods for making aqueous solutions of these organic titanates involve the use of large amounts of acid or organic solvent, these methods are unsuitable for large-scale industrial applications such as coating of fiber glass. The TYZOR line of titanates also includes chelated versions that provide some stability in aqueous media. Monofunctional ligands displace a portion of the alkoxy groups of the titanates in preparing these commercially available chelates. The chelated compounds include acetoacetates, lactates, and chelates of triethanolamine. Although useful in providing aqueous stability, these titanate chelates have been found to fall short in their film forming ability, apparently due to relatively low molecular weight increase when polymerized.

The prior art suggests the use of sol-gel techniques to apply metal oxides onto formed substrates such as woven fiber glass media (e.g., U.S. Pat. No. 4,966,759). It has been observed that the sol-gel approach results in rather thick layers of metal oxide that tend to be friable and poorly adherent to fiber glass substrates. It would be desirable to provide a durable, adherent metal oxide coatings on fiber glass from aqueous coating compositions.

SUMMARY OF THE INVENTION

In the present invention, novel chelates of metal alkoxides are provided that are stable in aqueous media. In particular, these include titanium alkoxides, but other photocatalytic materials such as the oxides of zinc, tungsten, and tin are also feasible. Additionally, the particular novel chelates of the present invention are characterized by the ability to form adherent films from aqueous compositions. As a result of this particularly advantageous combination of properties, the compounds of the present invention lend themselves to use in aqueous coating compositions. A specific example of such an aqueous composition is a sizing or binder composition for fiber glass, whereby a coating of photocatalytic metal oxide can be provided on filaments or strands of fiber glass. The coated fiber glass can then be fabricated into three-dimensional fluid/solid contact devices for treating gases or liquids. Although particularly useful for use on fiber glass, it should be understood that the present invention may be used for coating a wide variety of substrates that are know for use as catalyst supports, including, for example, glass beads, foraminous ceramic members, and metal mesh.

The invention is based on the discovery that titanium chelates formed by the reaction of polyalkyl metal oxides with certain ligands are soluble in water and are surprisingly stable in water against hydration. The polyalkyl metal oxides may be represented by the formula:

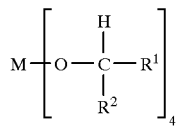

where M is titanium, zinc, tungsten, zirconium, or tin; $R^1$ is an alkyl group; and $R^2$ is hydrogen or an alkyl group, as will be further specified herein.

The ligands found useful for chelating the above organo metallic compounds in accordance with the present invention are polyalkylene glycols of the following structure:

where n and m are defined below. Particularly useful is diethylene glycol.

The chelates thus formed may be incorporated into aqueous coating compositions. In particular, sizing and binder compositions as are known in the fiber glass art may incorporate the chelates of the present invention. It has been found possible to formulate compositions that are stable for days against hydrolysis of the metal complexes. These compositions may be applied to fiber glass at the filament forming stage or after formation into textile or mat products. After heat treating to convert the organo metallic coatings to the photocatalytically active inorganic oxide form, these coatings have been found to be surprisingly adherent and free from mechanical loss of coating.

DETAILED DESCRIPTION

The starting material for synthesizing the chelates of the present invention are commercially available polyalkyl metal oxides, wherein the metal may be titanium, zinc, tungsten, or tin. These may be represented by the formula:

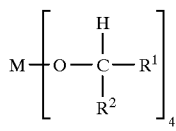

wherein M is titanium, zinc, tungsten, zirconium, or tin; $R^1$ is an alkyl group having 1 to 10 carbon atoms; and $R^2$ is hydrogen or an alkyl group having 1 to 2 carbon atoms. Titanium dioxide is a preferred metal oxide for photocatalytic applications, and accordingly polyalkyl titanates are preferred as the starting material here. Examples of suitable polyalkyl titanates are the non-chelated products sold by DuPont under the name TYZOR. Theoretically, the particular alkyl group on the titanate is of little significance in the present invention, but practical considerations favor relatively small alkyl groups, such as ethyl groups or propyl groups, since their derivatives are side products in the formation of the chelates of the present invention, and low boiling points make their removal easier. Thus, the total number of carbon atoms in $R^1$ plus $R^2$ is preferably limited to 2 to 7, most preferably 2 to 3. An example of a specific TYZOR titanate that has been found suitable is TYZOR TPT, which is tetraisopropyl titanate. Also commercially available are tetra-n-butyl titanate and tetrakis(2-ethyl) titanate, whose use would also be feasible in the present invention.

The above polyalkoxy metal compounds are reacted with a particular class of ligand to form a water soluble, hydrolysis resistant chelate in accordance with the present invention. The particular compounds that serve as ligands herein are dihydroxy alkoxy compounds having the structure:

The value m in the structure above is primarily determined by the requirement that the chelate be substantially hydrophilic in order to be compatible with aqueous compositions. Thus, m is preferably 2–3, that is, the ligand is comprised substantially of ethyl groups and/or propyl groups. Most preferably, m is 2.0 to 2.5. Small amounts of larger alkyl groups (m>3) may be tolerated without undue hydrophobic effect, but preferably the number of such groups is minimized. The average value of m would seldom be greater than 4 if hydrophobicity is to be avoided. The value of n in the structure above, i.e., the length of the alkoxy chain, is primarily influenced by the desire to avoid excessive organic content in the chelated titanates. In other words, very long alkoxy chains dilute the metal content of the chelate, which may be undesirable in view of the ultimate objective of providing a metal oxide coating on a substrate. Therefore, n is at least 2 but preferably less than 16, most preferably less than 8.

It is theorized that both hydroxyl groups of the ligand react with the titanate to form a chelated structure as follows (for the case of diethylene glycol as the ligand):

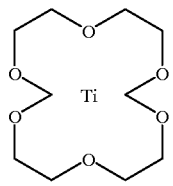

This chelate structure has been found to provide a high level of protection to the titanate against hydration. As a result, the chelated compounds of the present invention are surprisingly stable in aqueous compositions.

It is known to dope metal oxides with other metals such as platinum to enhance the photocatalytic activity of the catalyst. It should be understood that this doping may also be included in the coating compositions of the present invention if desired.

EXAMPLES

Examples 1 through 4 set forth the synthesis of specific embodiments of metal chelates of the present invention. Examples 1 and 2 describe the making of titanium chelates from different starting materials, Example 3 describes the making of a zirconium complex, and Example 4 describes the making of a tin complex. An aqueous fiber glass sizing or binder composition incorporating the chelate of Example 1 as set forth in Examples 5 through 7.

EXAMPLE 1

In a round bottom flask under a nitrogen atmosphere, 56.9 grams of titanium tetraisopropoxide and 42.4 grams of diethylene glycol were mixed with magnetic stirring. Isopropanol was distilled from the reaction mixture until the temperature of the mixture was 120° C. At this time, 36 milliliters of isopropanol had been collected, and the reaction product was very viscous. The material was allowed to cool and was removed from the reaction flask. The material was stored in a sealed jar.

EXAMPLE 2

In a 1 liter kettle containing 212 grams of diethylene glycol under a nitrogen atmosphere 299 grams of 95% titanium tetrapropoxide was added with mechanical stirring. The mixture was heated, and n-propanol was distilled off until 180 milliliters (142 grams) had been collected. The reaction product was yellow and viscous. After cooling to room temperature, the product (355 grams) was placed in a sealed plastic bottle.

EXAMPLE 3

Zirconium propoxide and diethylene glycol were combined under a nitrogen atmosphere with stirring. The mixture was heated until the temperature reached 120° C. During this time, 38 milliliters of propanol was collected by distillation. The viscous yellow reaction product was allowed to cool to room temperature, then stored in a sealed jar.

EXAMPLE 4

To 50 grams of reagent alcohol, 13 grams of tin tetrachloride was added slowly. The solution warmed with the addition of the $SnCl_4$. This solution was added dropwise to a stirred solution of 10.8 grams of sodium methoxide in 50 milliliters of reagent alcohol under a nitrogen atmosphere. With the addition of $SnCl_4$ solution, a white precipitate of NaCl began to form. The mixture was refluxed for 1 hour. After cooling, the NaCl precipitate was removed by filtration. To the colorless filtrate 10.6 grams of diethylene glycol was added dropwise with stirring. The solvent was removed by distillation until a viscous product formed.

Examples 5 through 7 illustrate the use of the titanium complex of Example 1 in aqueous sizing compositions for fiberglass. In each of these compositions, the titanium complex was stable for at least several days.

EXAMPLE 5

Constituents 1, 2, and 3 below were pre-mixed and set aside. Constituents 4, 5, and 6 were pre-mixed separately and then dispersed in component 7 by means of an Eppenbach high shear mixer.

| Constituent | Grams |
| --- | --- |
| 1. H$_2$O | 2000.0 g |
| 2. CARBOWAX 8000[1] | 374.6 |
| 3. Acetic acid | 2.6 |
| 4. Titanate chelate of Example 1 | 41.6 |
| 5. Acetic acid | 5.0 |
| 6. DOWANOL PM[2] | 41.6 |
| 7. Water | 1320.0 |

[1] Polyethylene oxide, molecular weight approximately 8000, available from Union Carbide Corp.
[2] Propylene glycol methyl ether available from Dow Chemical Co.

The dispersion was then stirred together with the pre-mix of constituents 1, 2, and 3. The resulting aqueous composition was stable for at least several days.

EXAMPLE 6

The following materials were added to a vessel in the order shown and then mixed in an Eppenbach high shear mixer.

| Constituent | Grams |
| --- | --- |
| H$_2$O | 2000.0 |
| CATION-X[1] | 9.1 |
| IGEPAL CA-630[2] | 42.4 |
| Acetic Acid | 12.7 |
| Titanate chelate of Example 1 | 83.2 |
| Acetic Acid | 10.0 |
| DOWANOL PM | 83.2 |
| H$_2$O | 1320.0 |

[1] A cationic fiber softener from Rhone-Poulenc.
[2] An ethoxylated alkyl phenol wetting agent from Rhone-Poulenc.

The mixture of Example 6 gelled. It was not a useful embodiment.

EXAMPLE 7

Constituents 1 and 2 below were pre-mixed and set aside. Constituents 3, 4, and 5 were pre-mixed. With the mixture of constituents 1 and 2 in an Eppenbach high shear mixer, the mixture of constituents 3, 4, and 5 was slowly added to produce an aqueous dispersion which remained stable for at least several days.

| Constituent | Grams |
| --- | --- |
| 1. H$_2$O | 1000 |
| 2. Acetic Acid | 4 |
| 3. Titanate chelate of Example 1 | 100 |
| 4. Acetic Acid | 7 |
| 5. DOWANOL PM | 100 |

The dispersion of Example 7 and dispersions essentially the same were successfully applied as aqueous sizing compositions to fiber glass as it was being formed. The fiber glass thus coated was woven into fabric or formed into mats of several types. Other fabrics and mats were formed from fiber glass with conventional sizings and subsequently impregnated with the dispersion of Example 7 by dipping. Removal of the conventional sizings by heat cleaning prior to impregnation was done in some cases, but was not required. The fabric or mats carrying the titanate dispersions were hung to dry and then heat treated at 400° C. to convert the titanium oxide coating on the fiber glass to the photocatalytic active anatase form. After heat treatment, the coatings had excellent adhesion, with no apparent loss of coating upon normal handling. This compared very favorably with sol-gel titanium dioxide coated fiber glass, with which copious loss of white powder had been observed upon handling. The photocatalytic activity of these coated fabrics and mats was tested by measuring photodegradation of styrene, formaldehyde, and stearic acid using the diffuse reflectance infrared technique. Substantial degradation was measured for all three substances, indicating that the coatings were photocatalytically active.

Other impregnating compositions that were successfully used with fiber glass substrates include the chelate of Example 1 with alcohols. For example, 30 grams of the product of Example 1 in 30 grams of isopropanol was used to impregnate fiber glass fabric. In an other example, 10 grams of the product of Example 1 in 100 grams of isopropanol was used to impregnate a continuous strand fiber glass mat.

The invention has been described in connection with particular embodiments for the sake of providing the best mode of the invention. It should be understood that other variations and modifications as would be known to those of skill in the art may be employed within the scope of the invention as defined by the claims.

We claim:

1. An aqueous coating composition comprising: water; and an organo-metal oxide chelate comprising the reaction product of (a) a metal oxide alkoxide having the structure

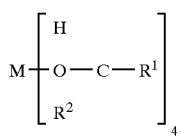

where M is titanium, zinc, tungsten, zirconium, or tin; $R^1$ is an alkyl group having 1 to 10 carbon atoms; and $R^2$ is hydrogen or an alkyl group having 1 to 2 carbon atoms; and (b) a compound having the structure

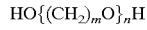

where n=2 to 16 and m=2 to 4.

2. The composition of claim 1 wherein $R^1$ and $R^2$ contain a total of two to seven carbon atoms.

3. The composition of claim 2 wherein (a) is tetra isopropyl titanate, and (b) is diethylene glycol.

4. The composition of claim 1 wherein n=2 to 8.

5. The composition of claim 4 wherein m=2 to 2.5.

6. The composition of claim 1 wherein (a) is tetra alkyl titanate, and (b) is polyethylene glycol.

* * * * *